(12) United States Patent
Nguyen (10) Patent No.: US 10,921,058 B2
(45) Date of Patent: *Feb. 16, 2021

(54) FULLY AUTOMATIC CONVECTION CURRENT VACUUM FREEZE DRYING METHOD

(71) Applicant: VINAMIT USA LLC, Tigard, OR (US)

(72) Inventor: Vien Lam Nguyen, Ho Chi Minh (VN)

(73) Assignee: VINAMIT USA LLC, Tigard, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/258,639

(22) Filed: Jan. 27, 2019

(65) Prior Publication Data

US 2020/0240706 A1 Jul. 30, 2020

(51) Int. Cl.
*F26B 5/06* (2006.01)
*F26B 5/04* (2006.01)
*F26B 21/10* (2006.01)
*A23L 3/44* (2006.01)

(52) U.S. Cl.
CPC .................. *F26B 5/06* (2013.01); *A23L 3/44* (2013.01); *F26B 5/042* (2013.01); *F26B 21/10* (2013.01); *F26B 2210/00* (2013.01)

(58) Field of Classification Search
CPC .. F26B 5/06; F26B 5/042; F26B 25/10; F26B 2210/00; F26B 21/10; A23L 3/44
USPC ......................................................... 34/284
See application file for complete search history.

(56) References Cited

U.S. PATENT DOCUMENTS

| 3,583,075 | A | * | 6/1971 | Folsom | F26B 5/06 34/288 |
| 4,177,577 | A | * | 12/1979 | Bird | F26B 5/06 34/92 |
| 5,298,275 | A | * | 3/1994 | Balasingham | A23L 2/02 426/333 |
| 5,665,413 | A | * | 9/1997 | Rossiter | A23G 9/305 426/384 |
| 5,884,413 | A | * | 3/1999 | Anger | F26B 5/06 34/92 |

(Continued)

FOREIGN PATENT DOCUMENTS

| DE | 10136498 A1 * | 2/2003 | ............... F26B 5/06 |
| EP | 1279913 A1 * | 1/2003 | ............... F26B 5/06 |

(Continued)

*Primary Examiner* — Stephen M Gravini (57) ABSTRACT

A convection current vacuum freeze drying method and a computer software program for manufacturing a product are disclosed which include: selecting specific freeze drying settings from a Database for a specific product; loading the specific freeze drying settings into a controller for fully controlling of the convection current freeze drying process; performing the convection current freeze drying process using an ice condenser unit equipped with a plurality of elongate heat exchange tubes having radially arranged fins; determining whether the convection current freeze drying process is operated in accordance to the specific freeze drying settings using a plurality of sensors and the controller, if the specific freeze drying settings are not corrected, then readjusting the specific freeze drying settings using the controller, and if the specific freeze drying settings are correct then packaging product.

20 Claims, 4 Drawing Sheets

(56) References Cited

U.S. PATENT DOCUMENTS

| | | | |
|---|---|---|---|
| 6,920,701 B2 * | 7/2005 | Haseley | F26B 5/06 34/92 |
| 8,793,895 B2 * | 8/2014 | Gasteyer, III | A61P 37/04 34/287 |
| 8,904,664 B2 * | 12/2014 | Pringle | A61F 2/02 34/105 |
| 8,984,763 B2 * | 3/2015 | Savarese | F26B 17/023 34/266 |
| 9,003,676 B2 * | 4/2015 | Yarborough | A61M 5/002 34/287 |
| 9,121,637 B2 * | 9/2015 | Ling | F26B 5/06 |
| 9,528,761 B2 * | 12/2016 | Kuu | F25D 17/02 |
| 9,739,532 B2 * | 8/2017 | Baugh | F26B 5/06 |
| 9,869,513 B2 * | 1/2018 | Kuu | F26B 5/06 |
| 10,113,797 B2 * | 10/2018 | Dern | A23L 3/44 |
| 10,143,716 B2 * | 12/2018 | McArthur | A61K 36/22 |
| 10,206,409 B2 * | 2/2019 | Peterson | A23C 9/1307 |
| 10,451,346 B1 * | 10/2019 | Nguyen | F26B 5/06 |
| 10,676,797 B1 * | 6/2020 | Nguyen | C13B 10/025 |
| 2004/0009609 A1 * | 1/2004 | Yarborough | F26B 5/06 436/174 |
| 2009/0074919 A1 * | 3/2009 | Smith | A23L 7/10 426/73 |
| 2019/0098891 A1 * | 4/2019 | Eroglu | A01N 1/0284 |
| 2019/0343898 A1 * | 11/2019 | Sinkkonen | A61P 37/02 |
| 2020/0017655 A1 * | 1/2020 | Li | C08J 9/283 |
| 2020/0085086 A1 * | 3/2020 | Roy | A23L 33/10 |
| 2020/0133224 A1 * | 4/2020 | Popp | G05B 19/056 |
| 2020/0158431 A1 * | 5/2020 | Trout | A61K 9/19 |

FOREIGN PATENT DOCUMENTS

| | | | | |
|---|---|---|---|---|
| JP | | 3984591 B2 * | 10/2007 | F26B 5/06 |
| WO | WO-03012355 A1 * | | 2/2003 | F26B 5/06 |
| WO | WO-2004047753 A2 * | | 6/2004 | G02B 21/28 |
| WO | WO-2004047753 A3 * | | 9/2004 | F26B 5/06 |

* cited by examiner

FULLY AUTOMATIC CONVECTION CURRENT VACUUM FREEZE DRYING METHOD

FIELD OF THE INVENTION

The present invention relates generally to the process of vacuum freeze drying. More specifically, the present invention relates to a vacuum freeze drying process using natural convection currents.

BACKGROUND ART

Vacuum freeze drying has been used to preserve foods and pharmaceutical products for many years. This process involves the removal of water or other unwanted solutes from a product by a physical phenomenon called sublimation. Sublimation is achieved when a product changes its phase from the solid phase directly into the gaseous phase without passing through the liquid phase. Thus, in the vacuum freeze drying process, a product undergoes freezing first, then pressure is dropped to almost the vacuum state, i.e., about 4.8 Torricelli (torr.) to a triple point or sublimation point—where solid, liquid, and gas states co-exist. When the product all the water and other solutes are frozen at the vacuum pressure, the temperature is again increased to achieve the sublimation phenomenon when the ice crystals of water and solutes become gases and removed, preserving the essence and flavors of the products. In comparison to the traditional drying method in the ambient temperatures, when the products are dehydrated by exposing to heat, their essence and flavors are reduced or sometimes destroyed. The essence of a product includes its color, taste, flavor, and nutritious content. This is because most materials and their essences cannot withstand high temperatures. In the vacuum freeze drying process, because only water and unwanted solutes are changed directly from frozen solid into gases, the essence, volume, and shape of the freeze dried products are preserved. As such, they are easier to preserve.

The advantages of the vacuum freeze drying process are obvious. The proper vacuum freeze dried products are easier to store at ambient temperatures without the need of refrigeration. In addition, the essence and flavor of the product are also intact. However, the vacuum freeze drying process are complex and requires expensive and specialized equipment, especially in the production scale. If the vacuum freeze drying process is not performed properly, the following problems may occur: (1) when the cooling rate is not sufficiently fast, the formation of large ice crystals can cause the freeze dried products to be brittle and destroy the microscopic structures of product; (2) when the cooling temperature is not below the eutectic temperature, water and unwanted solutes will not be completely removed, rendering the entire process ineffective; (3) when the pressures and temperatures are not carefully controlled, the product may collapse, destroying the product. In addition, the conventional vacuum freeze driers are largely controlled by human interfaces which can cause the above problems; and (4) each product requires different temperatures, pressures, and settings for being properly freeze dried, e.g., freeze drying water melons is different from walnuts because water melon contains more liquid than walnuts; using generic settings for different products would likely render the freeze drying process ineffective and uneconomical.

Therefore what is needed is a vacuum freeze drying apparatus and method that are fully automatic, i.e., controlled and observed by a controller or a computer that can create optimal freeze drying conditions for each specific product.

What is needed is a vacuum freeze drying apparatus and method that can provide a high rate of cooling so that the microscopic structures of the product are preserved.

Furthermore, what is needed is a vacuum freeze drying apparatus and method that can re-use the water vapors to provide heat to the product in the dryer unit so that energy is conserved and the entire vacuum freeze drying process is efficient.

Yet, what is needed is a vacuum freeze drying apparatus and method that can provide specific settings including temperatures, pressures, and cooling rates for specific products having different characteristics so that structural collapse can be avoided and optimal product quality can be obtained.

Finally what is needed is a computer software program stored in a non-transitory memory that can perform an optimal vacuum freeze drying process for different products when such computer software program is executed by a controller unit.

The method and vacuum freeze drying apparatus disclosed in the present invention achieve the above objectives.

SUMMARY OF THE INVENTION

Accordingly, an objective of the present invention is to provide a method for convection current freeze drying a product using an apparatus including a dryer unit, an ice condenser unit equipped with a plurality of elongate heat exchange tubes having radially arranged fins, a refrigerator unit, a vacuum pump unit, a cooling tower unit, a heater unit, a controller unit, and a Database, comprising: selecting specific freeze drying settings of the product stored in the Database; loading the specific freeze drying settings into the controller for fully controlling of the convection current freeze drying process; performing the convection current freeze drying process which comprises accelerating a freezing rate in the dryer unit by using the plurality of elongate heat exchange tubes having radially arranged fins; determining whether the said convection current freeze drying process is operated in accordance to the specific freeze drying settings using a plurality of sensors and the controller, if the specific freeze drying settings are not corrected, then readjusting the specific freeze drying settings using the controller unit, and if the specific freeze drying settings are correct then packaging the product.

Another objective of the present invention is to provide a computer software program stored in a non-transitory memory for performing a vacuum freeze drying process in a convection current vacuum freeze drying apparatus comprising a dryer unit, an ice condenser unit, a refrigerator unit, a vacuum pump unit, a heater unit, a cooling tower unit, a controller unit, and a Database, when executed by the controller the computer software program of the present invention performing a process comprising: selecting specific freeze drying settings of the product stored in the Database; loading the specific freeze drying settings into the controller for fully unit controlling of the convection current freeze drying process; performing the convection current freeze drying process which comprises accelerating a freezing rate in the dryer unit by using the plurality of elongate heat exchange tubes having radially arranged fins; determining whether the said convection current freeze drying process is operated in accordance to the specific freeze drying settings using a plurality of sensors and the controller, if the specific freeze drying settings are not corrected, then readjusting the specific freeze drying settings using the controller, and if the specific freeze drying settings are correct then packaging the product.

Another objective of the present invention is to achieve a vacuum freeze drying apparatus and process that are fully automatic, i.e., controlled and observed by a controller unit or computer that can create optimal freeze drying conditions.

Another objective of the present invention is to achieve a vacuum freeze drying apparatus and method that can provide a high rate of cooling using heat transfer of convection currents between the condenser unit and a plurality of elongate tubes having fins.

Furthermore, another objective of the present invention is to achieve a vacuum freeze drying apparatus and process that can re-use the water vapors from the sublimation to provide heat energy to the product in the dryer unit so that energy is conserved and the entire process is efficient.

Yet, another objective of the present invention is to achieve a vacuum freeze drying apparatus and process that can provide specific settings including temperatures, pressures, and cooling rates for products having different characteristics so that structural collapse can be avoided and optimal product quality can be obtained.

Finally another objective of the present invention is to achieve a computer software program stored in a non-transitory memory that can perform an optimal convection current vacuum freeze drying process for different products when such computer software program is executed by a controller unit.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
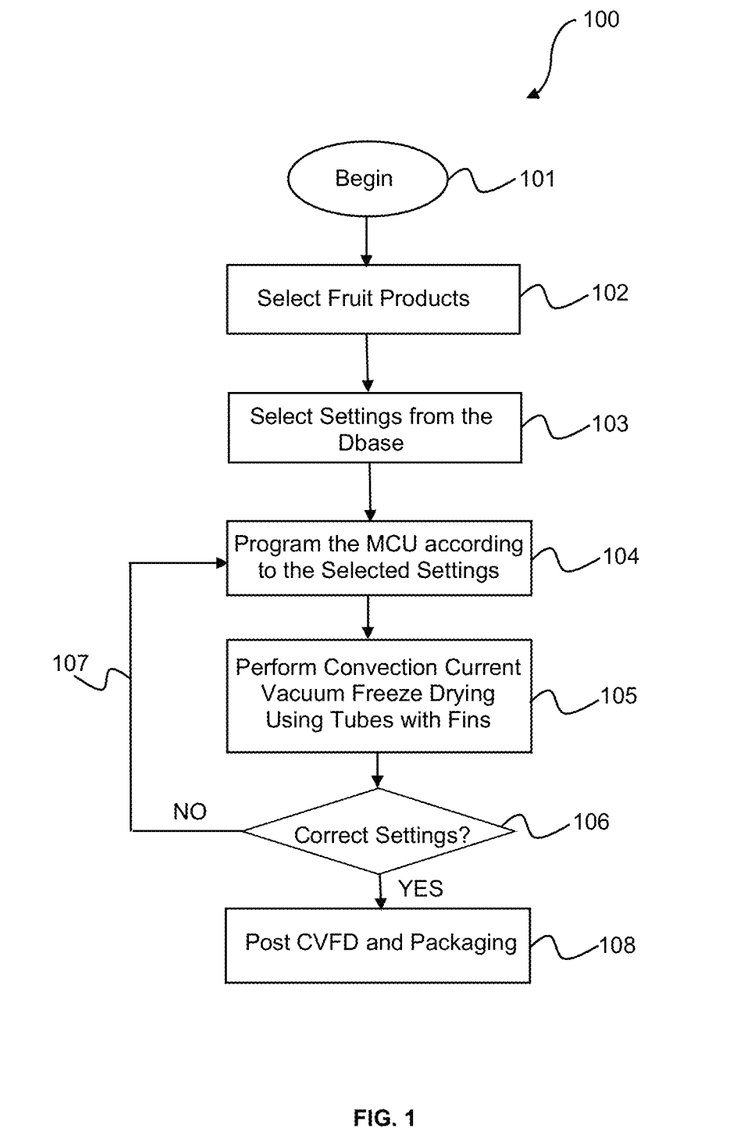
FIG. 1 is a flowchart illustrating a method for performing a vacuum freeze drying specific fruit products in accordance with an embodiment of the present invention.

One embodiment of the invention is now described with reference to FIG. 1. FIG. 1 illustrates a flowchart of a method 100 for performing a convection current vacuum freeze drying of a product in accordance with an exemplary embodiment of the present invention. In many aspects of the present invention, method 100 is implemented in a convection current vacuum freeze drying apparatus that includes a dryer unit, an ice condenser unit, a refrigerator unit, a cooling tower unit, a vacuum pump unit, and a water heater unit. All are connected together and controlled by a controller unit and a database. The database is pre-configured to store different vacuum freeze drying settings for different products. It will be noted that in some other embodiments, method 100 can be implemented by other types of vacuum freeze dryers using either natural or forced convection currents. Yet, in some other embodiments, method 100 can be implemented by other types of vacuum freeze dryers. An exemplary embodiment of a convection current vacuum freeze drying apparatus of the present invention will be described later in FIG. 3 and FIG. 4.

At step 101, method 100 begins by cleaning and checking all the electrical as well as mechanical connections between the component units described above. All valves are released to clear all excess water out of the system. In other words, step 101 involves all necessary preparations prior to the vacuum freeze drying process.

At step 102, a specific product to be vacuum freeze dried is selected. In many aspects of the present invention, product includes, but not limited to, fruits, tubers, vegetables, ready-to-drink coffee, yogurt, milks, liquids with high amount of protein solutes such as fish sauce, supplementary liquid enteral foods, etc.

At step 103, specific settings for the selected product in step 102 are located from a preconfigured Database. The preconfigured Database is a database built from careful empirical studies for each type of product listed above. Then, specific settings include eutectic temperatures ($T_{eu}$), critical temperatures ($T_C$), triple point or sublimation temperatures ($T_{SUB}$), pressures, durations for each phase (t sec), etc. for each product. The specific settings for each product are stored in the Database. In various embodiments of the present invention, Database includes data storage such as Look-Up Table (LUT); Read and Write memory; CD-ROM; DVD; HD-DVD; Blue-Ray Discs; semiconductor memory such as RAM, EPROM, EEPROM, etc.; and/or magnetic memory such as hard-disk drive, floppy-disk drive, tape drive, MRAM, etc. Simple exemplary settings in the Database in accordance with an exemplary embodiment of the present invention are listed in Table 1 below. Please note that Table 1 is only a simplified example of the Database of the present invention. In reality, the Database can have other settings listed above which are necessary to carry out an optimal convection current freeze drying process for each type of product.

TABLE 1

An Example of a Vacuum Freeze Drying Database

| Address | Products | Triple Point Temperatures | Pressures |
|---|---|---|---|
| 1 | Fruits such as Jack Fruits, Organge, Mangoes | <−20° C. | <0.5 Torr. |
| 2 | Tubers such as Potatoes, Carrots, Tarots | <−20° C. | <0.5 Torr. |
| 3 | Veggetables such as Seeweeds, | <−18° C. | <0.5 Torr. |
| 4 | Fruit Juice such as Water Melon, Sugercanes | <−30° C. | <0.1 Torr. |
| 5 | Juice Squeezed from Tuber such as Water Melon, Tarots | <−30° C. | <0.1 Torr. |
| 6 | Ready to Drink Coffee | <−20° C. | <0.2 Torr. |
| 7 | Yogurt | <−20° C. | <0.5 Torr. |
| 8 | High Protein Content Liquid such as Fish Sauce | <20° C. | <0.2 Torr. |

Next, at step 104, after all the settings are located in the Database, a controller unit is loaded with the above settings. In many exemplary embodiments of the present invention, the controller includes, but not limited to, a desktop computer, a laptop computer, a Programmable Logic Controller (PLC), a Supervisory Control and Data Acquisition (SCADA), or any other type of microprocessors or programmable logic array (PLA).

Next, at step 105, a convection current vacuum freeze drying process is performed under the full control of the controller unit. In various embodiments of the present invention, the ice condenser unit is equipped with elongate heat exchange tubes having radially arranged fins. Cold refrigerant gas from the refrigerating unit is moving at a high speed through each heat exchange tube. The cold refrigerant gas interacts with the ambient temperature to create natural convection currents, increasing the cooling rate of the vacuum freeze drying process. Thus, the natural convection currents cause heat transfer, bringing the temperature of the dryer unit to the triple point at a much faster rate. Thus, small ice crystals are formed in the product and the essence of the product is preserved.

At step 106, the settings are constantly observed in each step of the convection current vacuum freeze drying process. Step 106 is implemented by temperature sensors, pressure sensors, flow meters, valves, and pumps which are positioned in the dryer unit, ice condenser unit, refrigerating unit, cooling tower unit, vacuum pump unit, and heater unit. In some embodiments of the present invention, the controller unit and sensors can be connected together in a network such as wide area network (WAN), local area network (LAN), cloud-based network, etc. Sensors can be network-based including cloud-based or Internet of Things (IoT) including Industrial Internet of Things (IIoT) devices so that the settings and process 100 can be observed remotely by different mobile devices such as cell phones, laptops, PDAs, etc. The detailed description of the convection current vacuum freeze drying apparatus and the sensors of the present invention will be described later in FIG. 3.

At step 107, if any of the component of the settings such as timing, temperatures, and pressures not correct, the controller unit will adjust them so that optimal convection current vacuum freeze drying process can be achieved. As such, an objective of the present invention is achieved because process 100 is substantially automatic without human interfaces.

Finally at step 108, after the convection current vacuum freeze drying process is complete, clean-ups and packaging are performed.

From the disclosure of the present invention above, method 100 is a fully automatic method, i.e., controlled and observed by a controller unit or computer that can create optimal freeze drying conditions for each type of product.

Method 100 of the present invention also achieves high rate of cooling by convection currents caused by elongate heat exchange tubes with radially arranged fins.

Figure 2:
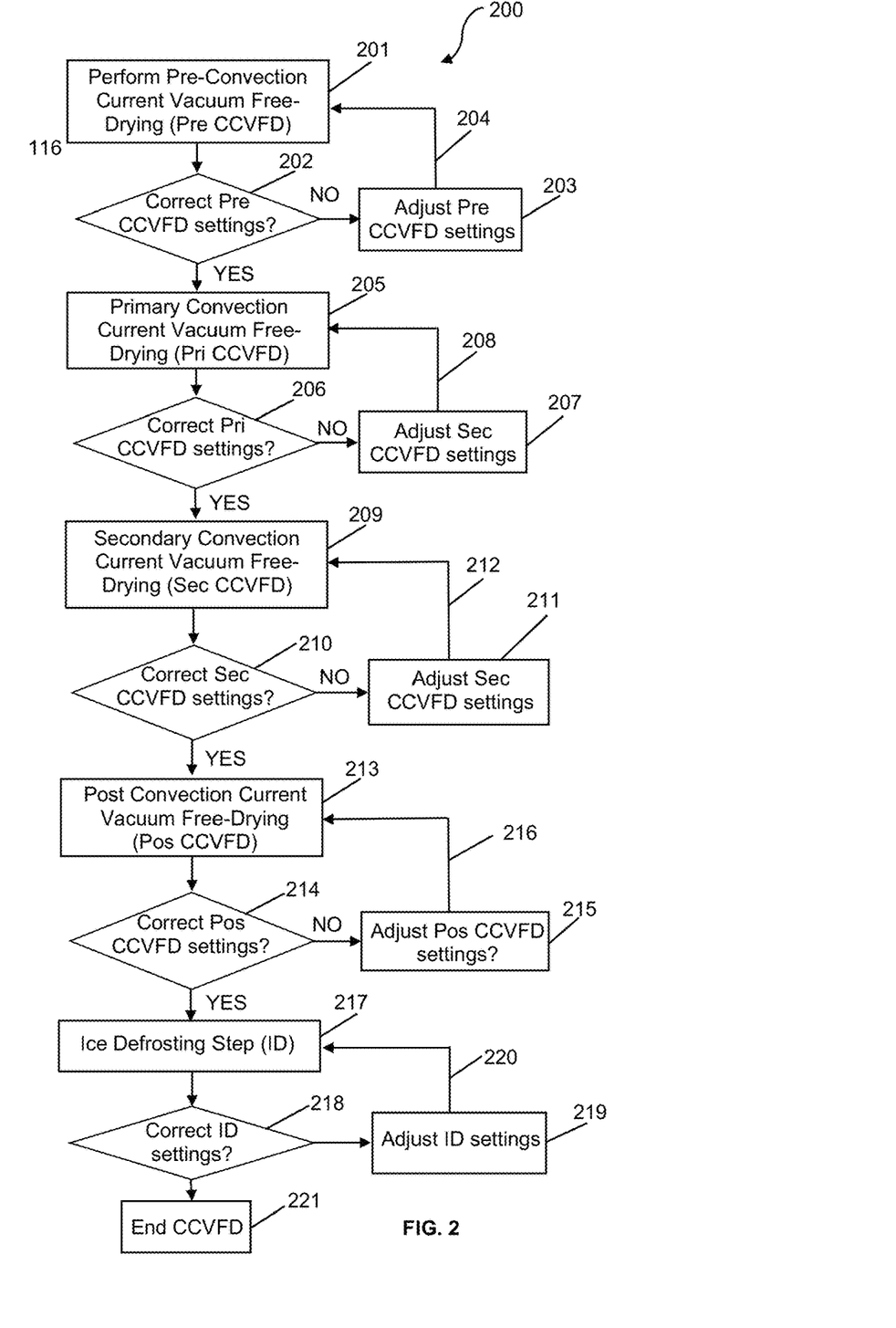
FIG. 2 is a flowchart illustrating a convection current vacuum freeze drying process in accordance with an exemplary embodiment of the present invention.

Next referring to FIG. 2, a flow chart illustrating a process 200 which describes in details the sub-steps of the convection current vacuum freeze drying step 105. Process 200 (or step 105) further includes the following sub-steps: performing the preliminary convection current vacuum free drying (pre CCVFD), performing the primary convection current vacuum free drying (pri CCVFD), performing secondary convection current vacuum free drying (sec CCVFD), performing post convection current vacuum free drying (post CCVFD), and performing ice defrosting.

At step 201, a preliminary convection current vacuum free drying sub-step (pre CCVFD) is performed. In this step, all the valves and flow meters are turned off so that all units are isolated from one another. The heater unit and the vacuum pump unit are turned off because it is not required in the early stages of the process. Meanwhile, the ice condenser unit, the refrigerator unit, and the cooling tower unit are turned on. The temperature inside the ice condenser unit is set to less than the initiation temperature of 5° C. Once this initiation temperature is achieved for a first predetermined time duration, a product listed in Table 1 is loaded either manually or by an automatic conveyor which is controlled by the controller unit. When all the trays in the dryer unit are finished loading, the vacuum pump unit is turned on and the valve connecting the vacuum pump unit and the refrigerating unit and the ice condenser unit are turned off. Next, a second predetermined time duration is set by the controller unit. Finally, the vacuum pump unit is checked for overloading. If the vacuum pump unit is overloaded, the controller unit will reset the second predetermined time duration until the overloading condition is cleared. Then, the valve connecting the vacuum pump unit and the ice condenser unit is slowly opened at a predetermined rate of approximately 5% per minute until this valve is fully opened. Thus, the objective of the pre CCVFD sub-step is to set up the initial temperature (less than 5° C.) and slowly turning on the vacuum pump unit at a predetermined rate of 5% per minute.

At step 202, the initiation temperature, the first predetermined time duration, the second predetermined time duration, the rate, and other settings of the preliminary convection current vacuum free drying are sensed by sensors and sent to the controller unit. The controller unit compares these observed setting data with those stored in the Database and determines whether the preliminary CCVFD is performed correctly. In some embodiments of the present invention, the settings can be observed remotely by any devices such as cell phones, laptops, computers, etc. that are connected to the network. In a preferred embodiment, the convection current vacuum free drying apparatus of the present invention is network-based. In some embodiments, the convection current vacuum free drying apparatus of the present invention is a stand-alone machine which is not connected to a network.

At step 203, if any of the settings is not correct, the controller unit or any devices that are connected to the network can alarm and adjust the settings so that the optimal preliminary CCVFD sub-step can be achieved.

At step 204, after correct the settings and/or alarming the overloading condition of the vacuum pump unit, the controller continues to perform the remaining of preliminary CCVFD step. In many implementations of step 204, if the controller unit detects a setting is not correct, all other factors are also taken into considerations such as temperatures, pressures, rate, time durations in order to determine a course of action will be taken during which a time-out may be imposed on the system until the incorrect settings are adjusted.

Next at step 205, a primary convection current vacuum free drying (pri CCVFD) sub-step is performed. In the primary convection current vacuum drying sub-step, the controller unit brings the ice condenser unit well below the triple point (sublimation) temperature of the product for a third predetermined time duration. Please see Table 1. As an example, if a fruit product is selected, the sublimation temperature is maintained at −20° C. for 11 hours. A vacuum pipe connecting the ice condenser unit and the vacuum pump unit is turned off so that the cold vapors from the ice condenser unit are prevented from entering the vacuum pump unit. It will be noted that the eutectic temperatures of the products are taken into consideration by the controller unit to avoid eutectic melt down of the product.

At step 206, the settings of the primary CCVFD are sensed by the sensors. Similar to step 202, the sublimation temperature, the third predetermine time duration, the state of the valves are constantly observed. In many embodiments of the present invention, all sensors are IoT devices.

At step 207, if any of the settings are not correct, the controller unit or any devices that are connected to the network can alarm and adjust the settings so that the optimal primary CCVFD results can be achieved.

At step 208, after correct the settings of the primary CCVFD, the controller unit continues step 208. A time-out may be imposed on the system until all incorrect settings are adjusted.

At step 209, secondary convection current vacuum freeze drying (sec CCVFD) sub-step is performed. In this step, the pressure is lowered to the triple point (sublimation) and a fourth time duration is set. In the case of fruit product is being freeze dried this fourth time period is 10 minutes. Then the tray temperatures are increased by 5° C. step by a fifth time duration of about 30 minutes. Finally, tray temperatures are held at 5° C. for a sixth predetermine time duration of about 8 hours so that all residual frozen solutes in the product change directly into vapor phases without becoming liquid. In step 209, heater unit is turned on and the all the valves are connecting the dryer unit and the heater unit are opened.

At step 210, the settings of the secondary CCVFD sensed by the sensors. Similar to step 202, the sublimation temperatures and pressures, tray temperatures, and the predetermine time durations are constantly observed.

At step 211, if any of the settings are not correct, the controller or any devices that are connected to the network can alarm and adjust the settings so that the optimal secondary CCVFD results can be achieved.

At step 212, after correct the settings of the secondary CCVFD, the controller unit continues step 209. A time-out may be imposed on the system until all incorrect settings are adjusted.

Now referring to step 213, a post convection current vacuum freeze drying (post CCVFD) sub-step is performed. In this step, the refrigerator unit, the vacuum pump unit, the cooling tower unit are turned off in that specific order for a seventh predetermined time duration prior to the release of the vacuum unit valve to avoid damaging the dried product.

At step 214, the settings of the post CCVFD are sensed by the sensors. Similar to step 202, the temperatures, flow meters, pressures, and the predetermine time durations are constantly observed.

At step 215, if any of the settings are not correct, the controller unit or any devices that are connected to the network can alarm and adjust the settings so that the optimal post CCVFD results can be achieved.

At step 216, after correct the settings of the post CCVFD, the controller continues step 209. A time-out may be imposed on the system until all incorrect settings are adjusted.

In some implementations of the present invention, method 200 may include step 217, an ice defrosting (ID) sub-step is performed. In this step, water vapors from the product after sublimation is forwarded to the heater unit to use the latent heat to defrost the ice crystals formed on the fins of the heat exchange tubes.

At step 218, the settings of the ID are sensed by the sensors. Similar to step 202, the temperatures of the heater unit are sensed.

At step 219, if any of the settings are not correct, the controller unit or any devices that are connected to the network can alarm and adjust the settings so that the optimal defrosting results can be achieved.

At step 220, after correct the settings of the ID, the controller unit continues step 218. A time-out may be imposed on the system until any of the incorrect settings are adjusted and all the ice are cleared.

Finally at step 221, the entire convection current vacuum freeze drying process 200 ends.

Implementations of process 200 disclosed above achieve the following objectives:

A precise step-by-step procedure including predetermined time durations, temperatures, pressure, flow rate, cooling rates are constantly observed and adjusted to that optimal vacuum freeze drying process can be achieved for each type of product.

A fully automatic and control with minimal human involvements so that errors can be avoided, good dried products can be guaranteed, and efficiency can be achieved.

High cooling rate is achieved due to the use of the natural convection currents of the present invention.

Figure 3:
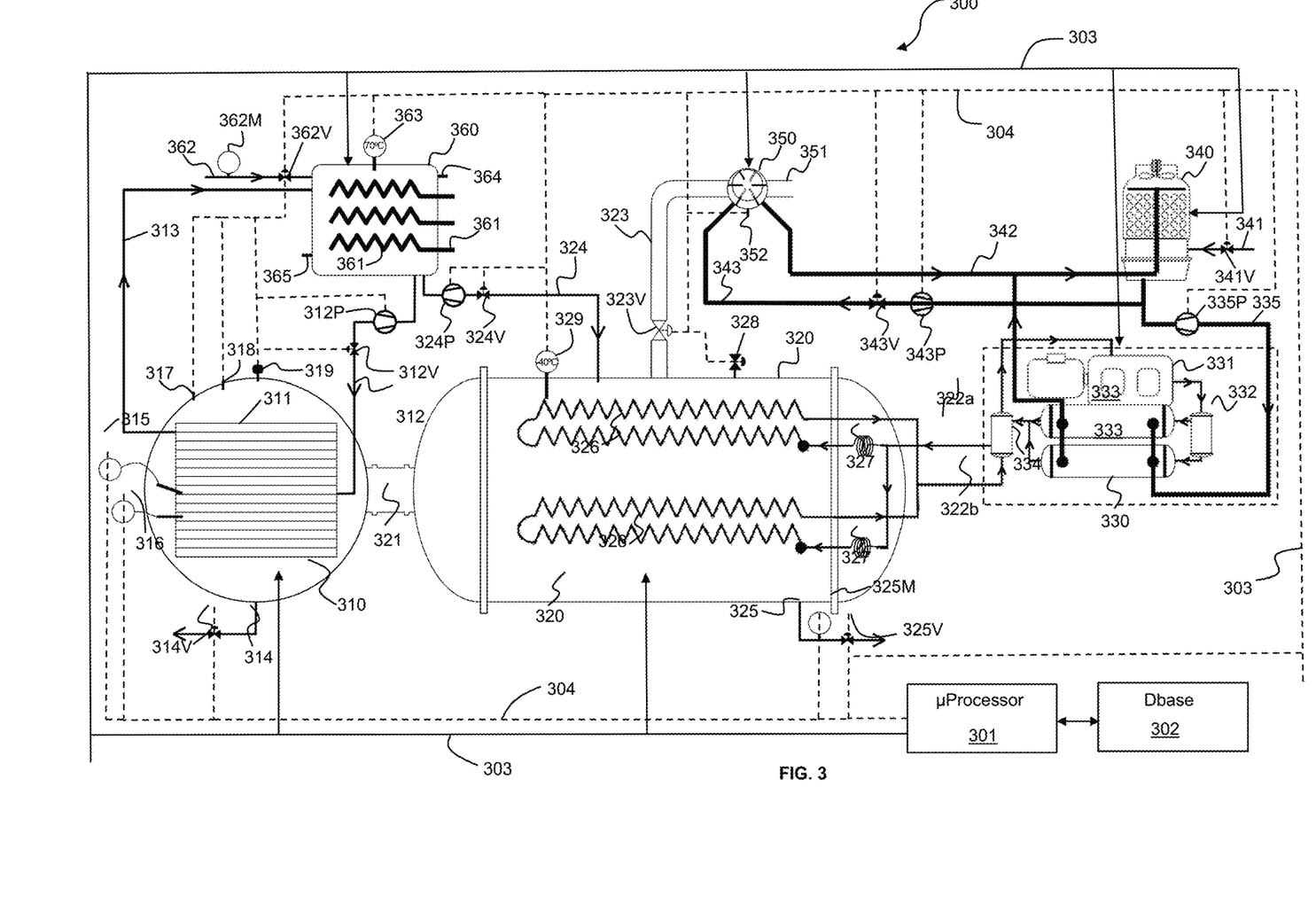
FIG. 3 is a schematic diagram of an exemplary vacuum freeze drying apparatus that employs the processes in FIG. 1 and FIG. 2.

Now referring to FIG. 3, a schematic diagram of a (natural) convection current vacuum freeze drying apparatus ("apparatus") 300 in accordance with an exemplary embodiment of the present invention is illustrated. Convection current vacuum freeze drying apparatus ("apparatus") 300 includes a dryer unit 310, a convection current condensing unit (ice condenser unit) 320, a refrigerator unit 330, a cooling tower unit 340, a vacuum pump unit 350, and a heater unit 360. In many embodiments of the present invention, apparatus 300 is not a stand-alone device. It is a network-based device that is connected to a controller unit 301 and a Database 302 in a network (not shown). The network can be a WAN, LAN, or a cloud-based network. Furthermore, ice condenser unit 320 includes a plurality of elongate tubes with fins that accelerate the heat exchange by natural convection currents between the temperatures inside ice condenser unit 320 and refrigerator unit 330, providing fast cooling rate as disclosed in process 200.

Continuing with FIG. 3, controller unit or computer 301 and [[database]] Database 302 connected to apparatus 300 by communication channels 303. Sensors described below are connected to controller 301 by communication channels 304. Communication channels 303 and 304 are wireless communication channels such as Wi-fi, Bluetooth, RF, optical, etc. In some embodiments, communication channels 303 and 304 maybe data transmission cables such as RS-232, RS-422, or USB, etc.

Controller unit 301 serves as the brain of convection current vacuum freeze drying apparatus 300. In some exemplary embodiments, controller unit 301 is a −16 or −32 bit Programmable Logic Controller (PLC), a Supervisory Control and Data Acquisition (SCADA), or any other type of programmable logic array (PLA) consisting of a memory chip and integrated circuits for control logic, monitoring, and communicating with other devices of apparatus 300. Controller unit 301 directs the programmable logic controller (PLC) and/or to execute control instructions, communicate with other units, carry out logic and arithmetic operations, and perform internal diagnostics. Controller unit 301 runs memory routines, constantly checking the PLC to avoid programming errors and ensure the memory is undamaged. Memory provides permanent storage to the operating system for Database 302 used by controller unit 301. Five programming languages are used in controller unit 301 and PLC. They are defined by the international standard IEC 61131. Ladder logic is one of the most commonly used PLC languages. Another programming language is function block diagram (FBD). It describes functions between input and output variables. The function, represented by blocks, connects input and output variables. FBD is useful in depicting algorithms and logic from interconnected controls systems. Structured Text (ST) is a high-level language that uses sentence commands. In ST, programmers can use "if/then/else," "SQRT," or "repeat/until" statements to create programs. Instruction list (IL) is a low-level language with functions and variables defined by a simple list. Program control is done by jump instructions and sub-routines with optional parameters. Sequential Function Chart (SFC) language is a method of programming complex control systems. It uses basic building blocks that run their own sub-routines. Program files are written in other programming languages. SFC divides large and complicated programming tasks into smaller and more manageable tasks.

Dryer unit 310 includes trays 311, a hot water pipe 312, a freeze dried chamber-heater hot water valve 312V, a freeze dried chamber-heater hot water pump 312P, a return water pipe 313, a discharge water pipe 314, a discharge water valve 314V, a first tray temperature transmitter 315, a second tray temperature transmitter 316, a front door switch 317, a rear door switch 318, a vacuum pressure transmitter 319, all connected as shown in FIG. 3. Freeze dried chamber-heater hot water valve 312V, freeze dried chamber-heater hot water pump 312P, discharge water valve 314V, first tray temperature transmitter 315, second tray temperature transmitter 316, front door switch 317, rear door switch 318, vacuum pressure transmitter 319 are network-based or Industrial Internet of Things (IIoT) devices and communicated to controller unit 301.

Continuing with FIG. 3, convection current condensing unit (ice condenser unit) 320 connects to dryer unit 310 by a large ice condenser and freeze dried chamber connection pipe 321. Ice condenser unit 320 is connected to refrigerator unit 330 via a liquid refrigerant pipe 322a, a gaseous refrigerant pipe 322b, and expansion capillary tubes 327. Ice condenser unit 320 is also connected to vacuum pump unit 350 via a vacuum pipe 323, a vacuum isolating valve 323V. Ice condenser unit 320 is connected to heater unit 360 via an ice condenser heater hot water pipe 324, an ice condenser heater hot water valve 324V, an ice condenser heater hot water pump 324P, an ice condenser discharge valve 325, an ice condenser discharge flow meter 325M, and an ice condenser discharge valve 325V. Ice condenser unit 320 further includes convection current heat exchanging tubes with fins 326, a vacuum release valve 328, and an ice condenser temperature transmitter 329. In many embodiments, vacuum isolating valve 323V, ice condenser heater hot water valve 324V, ice condenser heater hot water pump 324P, ice condenser discharge valve 325, ice condenser discharge flow meter 325M, and ice condenser discharge valve 325V, vacuum release valve 328, and ice condenser temperature transmitter 329 are network-based or Industrial Internet of Things (IIoT) devices controlled by controller unit 301.

Still referring to FIG. 3, refrigerator unit 330 includes a compressor 331, a refrigerant container 332, a liquid refrigerant heat exchanger 333, a refrigerant heat exchanger 334, a cooling water pipe 335, a cooling water pump 335P. Cooling water pump 335B is a network-based or an Industrial Internet of Things (IIoT) device that can be controlled by controller unit 301.

Still referring to FIG. 3, cooling tower unit 340 includes a feed water pipe 341, a feed water valve 341V, a hot water returning pipe 342, a cooling water pipe for vacuum pump unit 343, a cooling water pump for vacuum pump unit 343P, a cooling water valve for vacuum pump unit 343V. Feed water valve 341V, cooling water pipe for vacuum pump unit 343, cooling water pump 343P, a cooling water valve 343V are IoT devices which can be controlled and communicated to controller 301. Vacuum pump unit 350 includes a vacuum input pipe 351 and a current transformer transmitter which is an IoT device. Water heater unit (heater) 360, a three-phase heating element 361, a feed water pipe 362, a feed water flow meter 362M, a feed water valve 362V, a heater temperature transmitter 363, a high water level sensor 364, and a low water level sensor 365 which are also network-based or Industrial Internet of Things (IIoT) devices.

In operation, apparatus 300 is fully controlled by controller unit 301 as described in details in process 100 and process 200 above. In other words, in various embodiments of the present invention, method 100 and process 200 including sub-steps 201 to 221 are implemented by apparatus 300.

More specifically, as disclosed above convection current vacuum freeze drying process (see step 105) of the present invention further includes preliminary convection current vacuum freeze drying sub-steps (pre CCVFD) 201-204, primary convection current vacuum freeze drying sub-steps (pri CCVFD) 205-208, secondary convection current vacuum freeze drying sub-stepd (sec CCVFD) 209-212, post convection current vacuum freeze drying sub-step (post CCFVD) 213-216, and ice defrosting sub-step (ID) 217-220.

In the pri CCFVD sub-steps 201-204, the refrigerator unit 330 is started to collect cold air inside and dryer unit 310 and ice condenser unit 320. Discharge water valve 314V and ice condenser discharge valve 325V are closed. Cooling water pump for vacuum pump unit 343P and cooling water valve 343V are switched off. The water circulation in dryer unit 310 is closed off. At the same time, freeze dried chamber-heater hot water valve 312V is switched on. Fans in cooling tower unit 340 is turned on. Cooling water pump 335P is also turned on to cool compressors 331. After compressor 331 are turned on, the temperatures of a plurality of elongate heat exchange tubes with radially arranged fins 326 are recorded via temperature transmitter (also known as thermometer or thermal coupler) 329. Controller unit 301 observes whether the temperature is lowered by 5° C. If it does not, alarm signals are sent out. Controller unit 301 sends diagnostic signals to inspect refrigerator unit 330. If refrigerator unit 330 is normal, trays 311 are loaded with a selected product listed in Table 1. In some embodiments of the present invention, conveyors (not shown) will thrust trays 311 loaded with the selected product deep inside dryer unit 310.

Continuing with step pre CCVFD and FIG. 3, tray temperature transmitters 315 and 316 are moved into position to record tray temperatures during the convection current vacuum freeze drying process. The door(s) of dryer unit 310 are automatically closed by turning on front door switch 317 and rear door switch 318. Sensors will alarm controller unit 301 if doors are not hermetically closed. Cooling water valve 343V and current transformer transmitter 352 are switched on to cool vacuum pump unit 350. Vacuum isolating valve 323V is tightly switched off so that when vacuum pump unit 350 is turned on it will not be overloaded. Controller unit 301 observes when vacuum pump unit 350 is overloaded. If vacuum pump is overloaded, controller unit 301 tightens up vacuum isolating valve 323V and checks for overloading again. Some time-outs can be provided to apparatus 300 during correction steps. This correction steps repeat until vacuum pump unit 350 is not overloaded. When this condition happens, controller unit 301 turns on vacuum pump unit 350 by 5% per minute until vacuum pump unit 350 is fully throttled on. At this time, the pre CCVFD sub-step ends.

Continuing with FIG. 3, next the primary convection current vacuum freeze drying (pri CCVFD) is performed in apparatus 300. That is, steps 205-208 are performed. The temperatures on convection current heat exchange tubes with fins 326 are lowered and maintained at −20° C. The pressure inside ice condenser unit 320 is lowered to less than 5 Torricelli (torr.). This temperature and pressure are checked at a predetermined time duration of 10 minutes interval. Current intensities of current transformer transmitter 352 are reported. Tray temperatures from tray temperature transmitters 315 and 316 are also observed.

If the process proceeds normally, at −20° C. and 5 Torr., the water in the product in trays 311 will be frozen solid for about an hour. Then, valve 312V is turned on to circulate hot water to pipes (not shown) underneath trays 311 in order to bring the tray temperature to 5° C. for 11 hours. This time duration depends on the type of product being freeze dried. See Table 1. Controller 301 searches Database 302 to select the correct time duration for each product. In this time duration, all frozen water will be transformed directly to gaseous phase without becoming liquid first. This sublimation process is known as the triple-point in the phase diagram of water. The phase diagram of water is well-known in the art and needs not to be discussed in details here.

Continuing with FIG. 3, next the secondary convection current vacuum freeze drying (sec CCVFD) is performed in apparatus 300. That is, steps 209-212 are performed. This process (sec CCVFD) is very similar to the pri CCVFD process except that the temperatures inside dryer unit 310 are increased to about 65° C. by turning on the circulation of hot water from heater unit 360. Trays 311 are heated up by the vapors from the product during the convection current vacuum freeze drying process. The sec CCVFD aims is to vaporize the residual water from the product.

Still referring to FIG. 3, next the post convection current vacuum freeze drying (post CCVFD) is performed in apparatus 300. That is, steps 213-216 are performed. First, vacuum isolating valve 323V is turned off to prevent oils of vacuum pump unit 350 from entering ice condenser unit 320. Compressors 331 and cooling water pump 335P are switched off. Then freeze dried chamber-heater hot water valve 312V and freeze dried chamber heater hot water pump 312P are turned off. Cooling water pump 343P is turned off. At this moment, heater unit 360 ceases to provide heat energy to dryer unit 310. Thirty seconds (30 seconds) from the time vacuum isolating valve 323V is completely turned off, vacuum pump unit 350 is turned off. Cooling water valve 343V is turned off and cooling water pump 343 is locked. Then fans in cooling tower unit 340 are turned off. Vacuum release valve 328 is opened to bring the pressure inside ice condenser unit 320 to the atmospheric pressure (1 atm). A one minute time-out is given to apparatus 300 before discharge water valve 314V is opened. Front door switch 317 and rear door switch 318 are released. Vacuum freeze product can now be collected and packaged. Now, controller unit 301 can calculate the amount of water extracted from product by subtracting the amount of water recorded on flow meter 325M from that on flow meter 362M.

Still referring to FIG. 3, next the ice defrosting (ID) is performed in apparatus 300. That is, steps 217-220 are performed. First, water level of heater unit 360 is measured by high water level sensor 364 and low water level sensor 365. If the water level is low, water can be refilled via feed water tube 362 and feed water valve 362V. Three-phase heating elements 361 of heater unit 360 are turned on to defrost all the ice in ice condenser unit 320. The temperature or amount of heat to defrost depend on the amount of ice formed inside ice condenser unit 320. In some situations, this temperature can reach 90° C. After the ice defrosting is complete, three-phase heating elements 361 are turned off. Circular heat water pump 324P is turned off. The efficiency of the convection current vacuum freeze drying process can be calculated by subtracting the amount of input water provided to heater unit 360 measured on flow meter 362M from the amount of output water measured on flow meter 325M.

Figure 4:
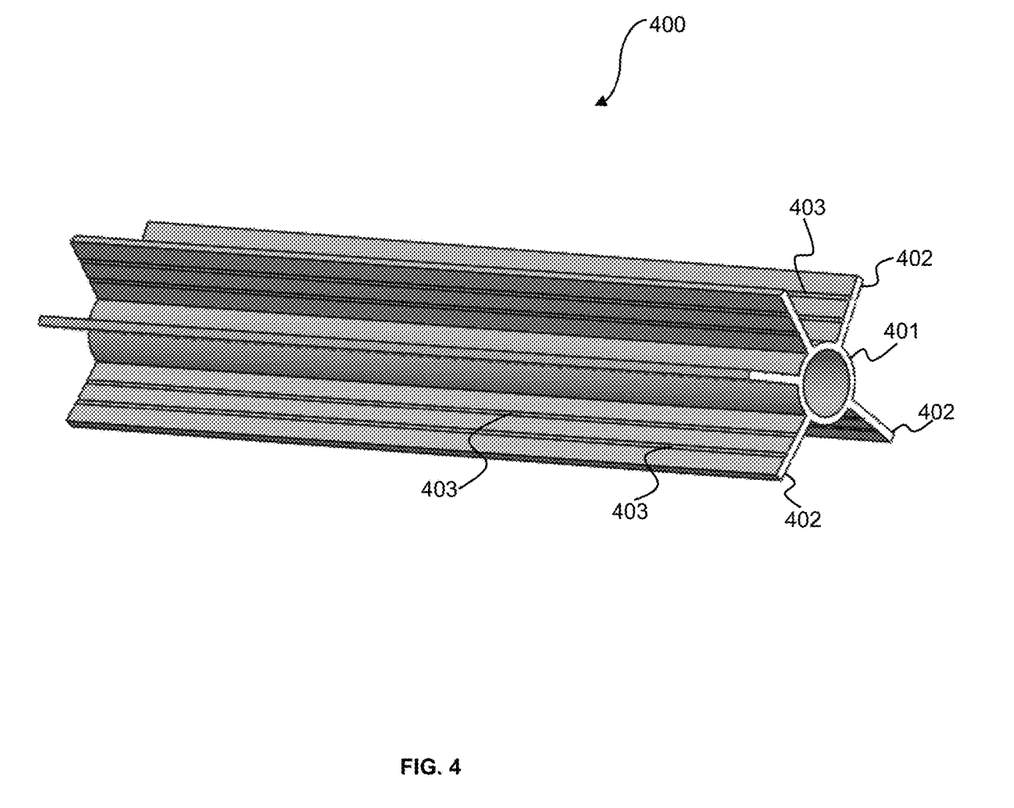
FIG. 4 is a perspective diagram of an elongate heat exchange tube having radially arranged fins configured to provide convection currents which result in fast cooling rate for the fruit products in the convection current vacuum freeze drying process in accordance with an exemplary embodiment of the present invention.

Finally referring to FIG. 4, a perspective diagram of an elongate heat exchange tube 400 (tube 400) having radially arranged fins that can provide convection currents in accordance with an exemplary embodiment of the present invention is illustrated. In some embodiments, tube 400—made of aluminum (Al) alloy—has an elongate cylindrical shape. Aluminum alloy has a thermal resistance of 0.4° C./W and a heat transfer coefficient of 59-64 W/m$^{2}$° K. Tube 400 has a diameter of 35 mm and thickness of 3.4 mm. Thus, tube 400 is hollow in the middle so that cold refrigerant gas can flow through it. Outer circumference of tube 400, rectangular fins 402 whose length spans across the length of tube 400 are arranged radially outward. Each rectangular fin 402 has a width of 30 mm, a length of 2400 mm, and a thickness of 4 mm. A plurality of parallel grooves 403 are formed along the entire length of fins 402. In some embodiments of the present invention, five rectangular fins 402 arranged radially on the outer circumference of each tube 400. Inside ice condenser unit 320, tubes 400 are arranged into 8 rows. Each row has 12 tubes 400. Tubes 400 in a row are separated by an equal distance of 116 mm. Each row is separated by 74 mm. In effect, elongate heat exchange tube with radially arranged fins 400 has an effective heat exchange area 3.28 times greater than that of tube without fins.

When cold refrigerant gas from refrigerating unit 330 is forced through capillary tubes 327, the convection current increases the heat transfer inside ice condenser 320. Heat transfer formula is $Q=h_c A_s(T_S-T_A)$. Where he is the heat transfer coefficient of fin 402, $A_S$ is its surface area, $T_S$ is the temperature of tube 400 and fins 402 and $T_A$ is the temperature of the moving air inside ice condenser 320. Thus, the more tubes 400 placed in ice condenser unit 320 and the larger the surface area of fins 402 the higher the heat transfer. Parallel grooves 403 creates vortex and increase the velocity of air flowing through each tube 400, thus increasing convection currents and heat exchange rate.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a apparatus, such that the instructions, which execute via the processor of the computer or other programmable data processing apparatus, create means for implementing the functions/acts specified in the flowchart and/or block diagram block or blocks.

Computer program code for carrying out operations for aspects of the present invention such as process 100 or process 200 may be written in any combination of one or more programming languages, including an object oriented programming language such as Python, Java, Smalltalk, C++, Ladder logic, FBD, ST, IL, SFC, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

300 Convection Current Vacuum Freeze Dryer (CCVFD)
301 Controller or computer
302 Database
303 Communication channels between controller and the CCVFD
304 Communication channels between controller and sensors
310 Dryer unit
311 Freeze Dried Trays (trays)
312 Hot water pipe
312V Freeze dried chamber-heater hot water valve
312P Freeze dried chamber-heater hot water pump
313 Return water pipe
314 Discharge water pipe
314V Discharge water valve
315 First tray temperature transmitter
316 Second tray temperature transmitter
317 Front door switch
318 Rear door switch
319 Vacuum pressure transmitter
320 Convection current condensing unit (Condenser)
321 Large ice condenser and freeze dried chamber connection pipe
322a Liquid refrigerant pipe
322b Gaseous refrigerant pipe
323 Vacuum pipe
323V Vacuum isolating valve
324 Ice condenser heater hot water pipe
324V Ice condenser heater hot water valve
324P Ice condenser heater hot water pump
325 Ice condenser discharge valve
325M Ice condenser discharge flow meter
325V Ice condenser discharge valve
326 Convection current heat exchanging tubes with fins
327 Expansion capillary tubes
328 Vacuum release valve
329 Ice condenser temperature transmitter
330 Refrigerator unit
331 Compressor
332 Refrigerant container
333 Liquid refrigerant heat exchanger
334 Refrigerant heat exchanger
335 Cooling water pipe
335P Cooling water pump
340 Cooling tower unit
341 Feed water pipe
341V Feed water valve
342 Hot water returning pipe
343 Cooling water pipe for vacuum pump unit
343P Cooling water pump for vacuum pump unit
343V Cooling water valve for vacuum pump unit
350 Vacuum pump unit
351 Vacuum input pipe
352 Current transformer transmitter of the vacuum pump unit
360 Water heater unit (heater)
361 Three-phase heating element
362 Feed water pipe for heater
362M Feed water flow meter for heater
362V Feed water valve for heater
363 Heater temperature transmitter
364 High water level sensor
365 Low water level sensor
400 Convection current heat exchanging tubes with fins
401 Elongate tube
402 Fins
403 longitudinal grooves on fins

What is claimed is:

1. A method for vacuum freeze drying a product using an apparatus including a dryer unit, an ice condenser unit equipped with a plurality of elongated heat exchange tubes having radially arranged fins, a refrigerator unit, a vacuum pump unit, a cooling tower unit, a heater unit, a controller unit, and a memory device, said method comprising:
  selecting specific freeze drying settings of said product stored in said memory device;
  loading said specific freeze drying settings into said controller unit for controlling of said apparatus;
  performing a convection current freeze drying process which comprises accelerating a freezing rate in said ice condensing unit by using said plurality of elongate heat exchange tubes having radially arranged fins;
  determining whether said convection current freeze drying process is operated in accordance to said specific freeze drying settings using a plurality of sensors and said controller unit to obtain sensed freeze drying settings, if sensed freeze drying settings are different from said specific freeze drying settings, then readjusting said sensed freeze drying settings using said controller unit, and
  if said sensed freeze drying settings are correct then packaging said product.

2. The method of claim 1 wherein said specific freeze drying settings and said sensed freeze drying settings further comprise temperatures, pressures, predetermined time durations, flow rates, pump rates, open or close states of valves, and freezing rates for said product.

3. The method of claim 1 wherein said plurality of sensors further comprises thermometers, pressure sensors, timing devices, pumps, valves, and flow meters.

4. The method of claim 1 wherein said controller unit further comprises a desktop computer, a laptop computer, a programmable logic controller (PLC), and a supervisory control and data acquisition (SCADA).

5. The method of claim 4 wherein said apparatus is connected to a network and said controller unit communicates with said plurality of sensors by means of a first communication channel and wherein said controller unit performs said convection current freeze drying process by means of a second communication channel.

6. The method of claim 5 wherein said convection current freeze drying step further comprises:
  performing a preliminary convection current vacuum freeze drying step to avoid overloading a vacuum unit and to calibrate a refrigerator unit;
  performing a primary convection current vacuum freeze drying step by lowering the temperature and pressure to a sublimation triple point temperature;
  performing a secondary convection current vacuum freeze drying step by increasing a temperature to further dry said product; and
  performing a post convection current vacuum freeze drying step to increase increasing a pressure and to lower said temperature to an ambient condition.

7. The method of claim 6 wherein performing said secondary convection current vacuum freeze drying step further comprises increasing said temperature inside said dryer unit by circulating water vapors in said heater unit.

8. The method of claim 6 wherein performing said primary convection current vacuum freeze drying step further comprising increasing a freezing rate to accelerate said temperature to a triple point (or sublimation) by using natural convection currents created by said plurality of elongate heat exchange tubes having radially arranged fins.

9. The method of claim 6 wherein performing said primary convection current vacuum freeze drying step further comprising increasing the freezing rate in said dryer unit by using a large connection tube between said ice condenser unit and said dryer unit.

10. The method of claim 6 further comprises an ice defrosting step by increasing a temperature inside said ice condenser unit to defrost all ice formation on said plurality of elongate heat exchange tubes having radially arranged fins.

11. A computer software program stored in a non-transitory memory for performing a freeze drying process in a convection current vacuum freeze drying apparatus comprising a dryer unit, an ice condenser unit, a refrigerator unit, a vacuum pump unit, a heater unit, a cooling tower unit, a controller unit, and a memory device, when executed by said controller unit said computer software program performing a process comprising:
   loading specific freeze drying settings of a product stored in said memory device into said controller unit for fully controlling of said convection current vacuum freeze drying apparatus;
   performing said freeze drying process using said convection current vacuum freeze drying apparatus, wherein said ice condenser unit comprises a plurality of elongate heat exchange tubes having radially arranged fins;
   determining whether said freeze drying process is operated in accordance to said specific freeze drying settings using a plurality of sensors and said controller unit to measure said freeze drying process, if said freeze drying process is different from said specific freeze drying settings, then readjusting said specific freeze drying settings using said controller unit, and
   if said sensed freeze drying process is the same as said specific freeze drying settings then packaging said product.

12. The computer software program of claim 11 wherein said specific freeze drying settings further comprise temperatures, pressures, predetermined time durations, flow rates, pump rates, open or close states of valves, and freezing rates for said product.

13. The computer software program of claim 11 wherein said a plurality of sensors further comprise thermometers, pressure sensors, timing devices, pumps, valves, and flow meters.

14. The computer software program of claim 11 wherein said controller unit further comprises a desktop computer, a laptop computer, a programmable logic controller (PLC), and a supervisory control and data acquisition (SCADA).

15. The computer software program of claim 14 wherein said convection current vacuum freeze drying apparatus is connected to a network and said controller unit communicates with said sensors by means of a first communication channel and wherein said controller unit performs said convection current freeze drying process by means of a second communication channel.

16. The computer software program of claim 15 wherein said vacuum freeze drying process further comprises:
   performing a preparatory convection current vacuum freeze drying step to avoid overloading said vacuum pump unit and to initialize said ice condenser unit;
   performing a primary convection current vacuum freeze drying step by lowering a temperature and pressure to a sublimation triple point temperature using said plurality of elongate heat exchange tubes having radially arranged fins;
   performing a secondary convection current vacuum freeze drying step by increasing said temperature to further dry said product; and
   performing a post convection current vacuum freeze drying step to increase a pressure and to lower said temperature to an ambient condition.

17. The computer software program of claim 16 wherein performing said secondary convection current drying step further comprises increasing said temperature by circulating water vapors from said primary convection current freeze drying to a heater unit.

18. The computer executable software program of claim 16 wherein performing said primary convection current vacuum freeze drying step further comprising increasing a freezing rate in said dryer unit by means of convection currents using said plurality of elongate heat exchange tubes having radially arranged fins.

19. The computer software program of claim 16 wherein performing said primary convection current vacuum freeze drying step further comprising increasing a freezing rate by using a large connection pipe between said ice condenser unit and said dryer unit.

20. The computer software program of claim 16 further comprises an ice defrosting step by increasing said temperatures inside said ice condenser unit to defrost all ice formation on said plurality of elongate heat exchange tubes having radially arranged fins.

\* \* \* \* \*